United States Patent
Hou et al.

(10) Patent No.: US 8,451,690 B2
(45) Date of Patent: May 28, 2013

(54) METHOD OF CONTROLLING A LIGHTING SYSTEM WITH AN ULTRASONIC TRANSCEIVER

(75) Inventors: Sheng-Fa Hou, Taipei (TW); Tzu-Nan Chen, Taipei (TW)

(73) Assignee: Lite-On It Corporation, Taipei (TW)

( * ) Notice: Subject to any disclaimer, the term of this patent is extended or adjusted under 35 U.S.C. 154(b) by 342 days.

(21) Appl. No.: 12/742,146

(22) PCT Filed: Nov. 12, 2007

(86) PCT No.: PCT/CN2007/003201
§ 371 (c)(1),
(2), (4) Date: May 10, 2010

(87) PCT Pub. No.: WO2009/062335
PCT Pub. Date: May 22, 2009

(65) Prior Publication Data
US 2010/0259174 A1 Oct. 14, 2010

(51) Int. Cl.
*G01S 15/00* (2006.01)
*G01S 15/04* (2006.01)
*G01S 15/12* (2006.01)

(52) U.S. Cl.
CPC . *G01S 15/04* (2013.01); *G01S 15/12* (2013.01)
USPC .............................................. 367/95; 367/96

(58) Field of Classification Search
USPC ....................................... 367/95, 96; 315/149
See application file for complete search history.

(56) References Cited

U.S. PATENT DOCUMENTS

| 4,884,008 | A | 11/1989 | Bossler et al. |
| 5,372,545 | A * | 12/1994 | Noda et al. ..................... 454/256 |
| 7,221,271 | B2 * | 5/2007 | Reime ........................... 340/541 |
| 2003/0222587 | A1 * | 12/2003 | Dowling et al. ............... 315/149 |
| 2006/0044800 | A1 * | 3/2006 | Reime ........................... 362/276 |
| 2006/0074494 | A1 * | 4/2006 | McFarland ....................... 700/1 |
| 2006/0239471 | A1 * | 10/2006 | Mao et al. ......................... 381/92 |

FOREIGN PATENT DOCUMENTS

| CN | 1434242 A | 8/2003 |
| CN | 2784732 Y | 5/2006 |
| GB | 2406634 A | 6/2005 |
| JP | 6260004 A | 9/1994 |
| WO | 2006056814 A | 6/2006 |

OTHER PUBLICATIONS

International Report and Written Opinion dated Aug. 11, 2008.

* cited by examiner

*Primary Examiner* — Isam Alsomiri
*Assistant Examiner* — James Hulka
(74) *Attorney, Agent, or Firm* — McClure, Qualey & Rodack, LLP

(57) ABSTRACT

A control method for use with a lighting system is provided. The lighting system includes a light source and an ultrasonic transceiver. The control method includes steps of: measuring the time of an ultrasonic signal emitted from the ultrasonic transceiver and reflected by the object to reach the ultrasonic sensor to obtain a time of flight; calculating a distance between the object and the ultrasonic transceiver according to the time of flight; defining at least one control region according to the distance; and moving the object to the control region, thereby performing a controlling operation corresponding to the control region and adjusting an optical characteristic.

12 Claims, 10 Drawing Sheets

| | 1st | 2nd | 3rd | 4th | 5th | 6th | 7th | 8th | 9th | 10th | 11th | 12th |
|---|---|---|---|---|---|---|---|---|---|---|---|---|
| R | 80% | 60% | 40% | 20% | 0 | 0 | 0 | 0 | 0 | 20% | 40% | 60% |
| G | 0 | 20% | 40% | 60% | 80% | 60% | 40% | 20% | 0 | 0 | 0 | 0 |
| B | 0 | 0 | 0 | 0 | 0 | 20% | 40% | 60% | 80% | 60% | 40% | 20% |

| | 1st | 2nd | 3rd | 4th | 5th | 6th | 7th | 8th | 9th | 10th | 11th | 12th |
|---|---|---|---|---|---|---|---|---|---|---|---|---|
| Intensity | 1.2 | 1.1 | 1.0 | 0.1 | 0.8 | 0.7 | 0.6 | 0.5 | 0.4 | 0.3 | 0.2 | 0.1 |

1

METHOD OF CONTROLLING A LIGHTING SYSTEM WITH AN ULTRASONIC TRANSCEIVER

CROSS REFERENCE TO RELATED APPLICATION

This application is the 35 U.S.C. §371 national stage of PCT application PCT/CN2007/003201, filed Nov. 12, 2007, the disclosure of which is hereby incorporated by reference.

FIELD OF THE INVENTION

The present invention relates to a method of controlling a lighting system, and more particularly to a method of controlling optical characteristics of a lighting system.

BACKGROUND OF THE INVENTION

A light emitting diode (LED) is a semiconductor device capable of converting electrical energy into visible light and radiation energy when electrical current flows between the anode and the cathode due to a voltage applied on both terminals of the semiconductor device. When the current passes through the LED in the forward direction, electrons recombine with holes and the extra energy is released in the form of light. The wavelength of the emitted light corresponds to the material and the energy associated with electron-hole pair recombination. The advantages of using the LED include a low operating voltage, low power consumption, high illuminating efficiency, very short response time, pure light color, high structural firmness, high impact resistance, excellent performance reliability, light weight, cost effectiveness, long service life, and so on. Therefore, the incandescent bulbs or mercury vapor lamps used in the conventional lighting system are gradually replaced by LEDs in many applications.

By using three primary color LEDs, for example a combination of red (R), green (G) and blue (B) LEDs, and adjusting the brightness of the LEDs, output light beams with various emission colors can be produced. Generally, the lighting system has a user operation interface (e.g. a button or a knob) or a remote controller. By triggering the user operation interface or using the remote controller, the brightness or the color of the output light from the lighting system can be controlled accordingly. Recently, an ultrasonic transceiver has been employed in the lighting system so as to adjust the light strength or the light color.

FIG. 1A is a schematic diagram illustrating a lighting system with an ultrasonic transceiver to control the light strength or the light color according to the prior art. As shown in FIG. 1A, the lighting system comprises a light source 10 and an ultrasonic transceiver 11. The light source 10 comprises a red (R) LED, a green (G) and a blue (B) LED. When an object 12 (e.g. a user's hand) enters the sensing range of the ultrasonic transceiver 11, an ultrasonic signal emitted by the ultrasonic transceiver 11 is reflected by the object 12, and the reflected ultrasonic signal (or an echo signal) is then transmitted to a receiver of the ultrasonic transceiver 11. Upon receipt of the echo signal, the processor of the lighting system may measure the time of flight (TOF) of the ultrasonic signal. In the context, the time of the ultrasonic signal emitted from the ultrasonic sensor and reflected by the object to reach the receiver of the ultrasonic sensor is referred as the time of flight (TOF). According to the TOF, the distance R between the object 12 and the receiver of the ultrasonic transceiver 11 can be deduced. According to a change of the distance R, a control signal is generated. In response to the control signal, the light source 10 of the lighting system can produce light with adjustable optical characteristics including the light strength or the light color.

FIG. 1B is a schematic diagram illustrating another lighting system disclosed in WO 2006/056814. As shown in FIG. 1B, the lighting system principally comprises an infrared transceiver 13 and a light-emitting unit 13. When an object 12 (e.g. a user's hand) enters the sensing range of the infrared transceiver 13, an infrared beam 15 emitted by the infrared transceiver 13 is reflected by the object 12, and the reflected infrared beam 16 is then transmitted to an infrared receiver 17 of the infrared transceiver 13. Generally, the intensity of infrared light 16 reflected from the object 12 and received by the infrared transceiver 13 is dependent on the inverse square of the distance between the infrared transceiver 13 and the object 12. By determining the movement of the object 12 away from or toward the infrared transceiver 13, the brightness or the color of the output light from the light-emitting unit 14 of the lighting system is adjustable accordingly.

The above lighting systems, however, still have some drawbacks. For example, only one of the optical characteristics can be adjusted at a time. Since the light strength adjusting operation and the light color adjusting operation fail to be simultaneously done, the conventional light-adjusting methods are not user-friendly. Therefore, there is a need of providing an improved light-adjusting method to obviate the drawbacks encountered from the prior art.

SUMMARY OF THE INVENTION

In accordance with an aspect of the present invention, there is provided a control method for use with a lighting system. The lighting system includes a light source and an ultrasonic transceiver. The control method includes steps of: measuring the time of an ultrasonic signal emitted from the ultrasonic transceiver and reflected by the object to reach the ultrasonic sensor to obtain a time of flight; calculating a distance between the object and the ultrasonic transceiver according to the time of flight; defining at least one control region according to the distance; and moving the object to the control region, thereby performing a controlling operation corresponding to the control region and adjusting an optical characteristic.

In accordance with an aspect of the present invention, there is provided a control method for use with a lighting system. The lighting system includes an ultrasonic transceiver. The control method includes steps of: entering a wait-for-enabling mode after the lighting system is powered on; measuring the time of an ultrasonic signal emitted from the ultrasonic transceiver and reflected by the object to reach the ultrasonic sensor to obtain a time of flight; calculating a distance between the object and the ultrasonic transceiver according to the time of flight; defining at least one control region according to the distance; entering a wait mode; discriminating whether the object is moved to one specified control region within a specified time interval; entering a control mode if the object is moved to the specified control region within the specified time interval, and performing a controlling operation corresponding to the control region and adjusting an optical characteristic; and entering a standby mode if the object is not moved to the specified control region within the specified time interval

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

Figure 1A:
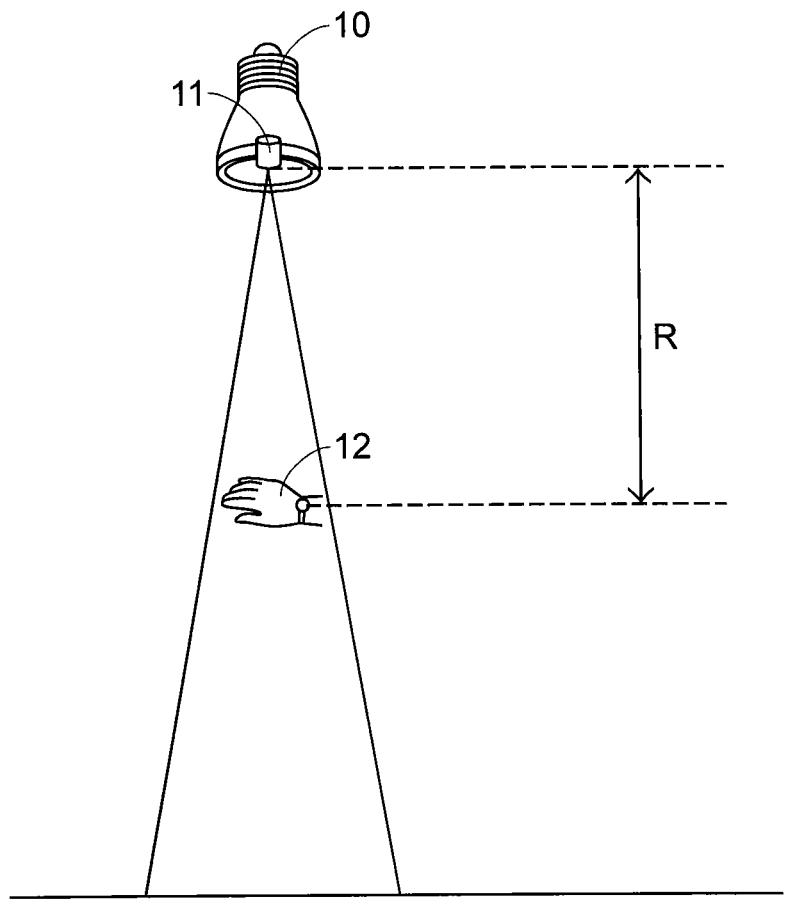
FIG. 1A is a schematic diagram illustrating a lighting system with an ultrasonic transceiver to control the light strength or the light color according to the prior art.
Figure 1B:
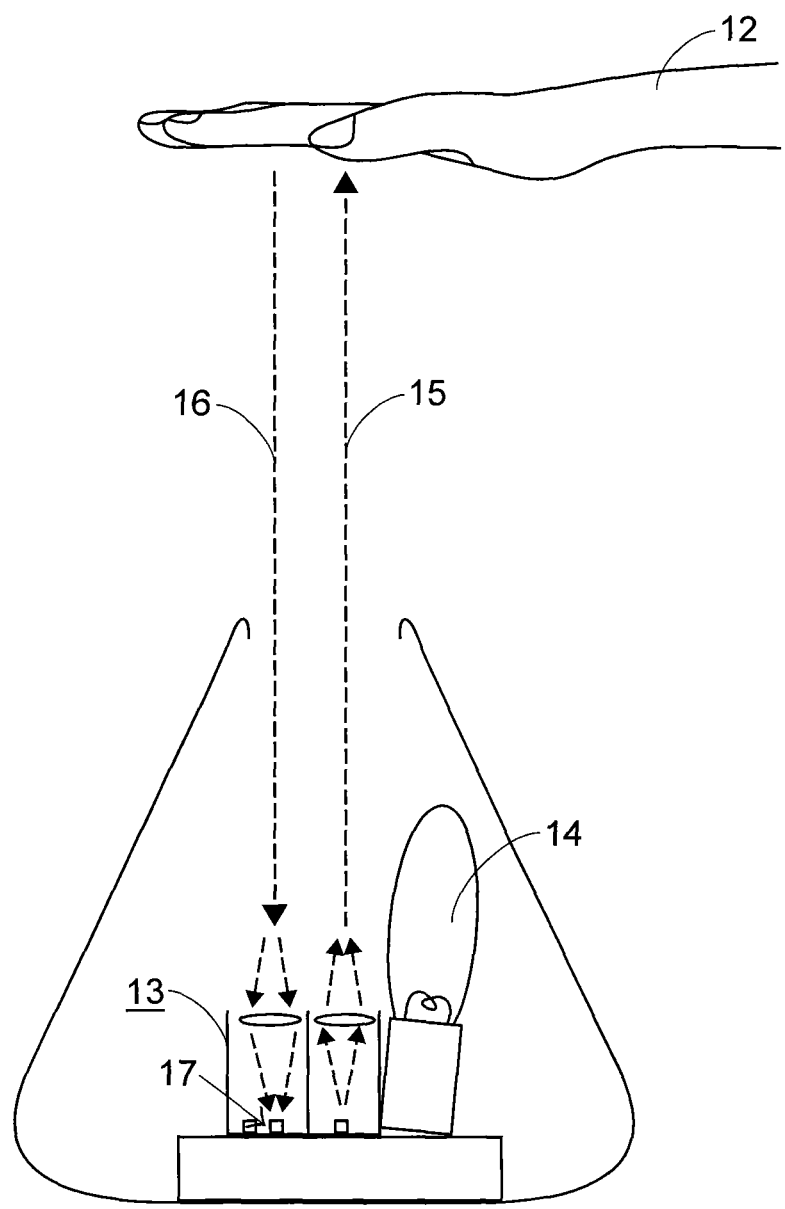
FIG. 1B is a schematic diagram illustrating another lighting system according to the prior art.
Figure 2A:
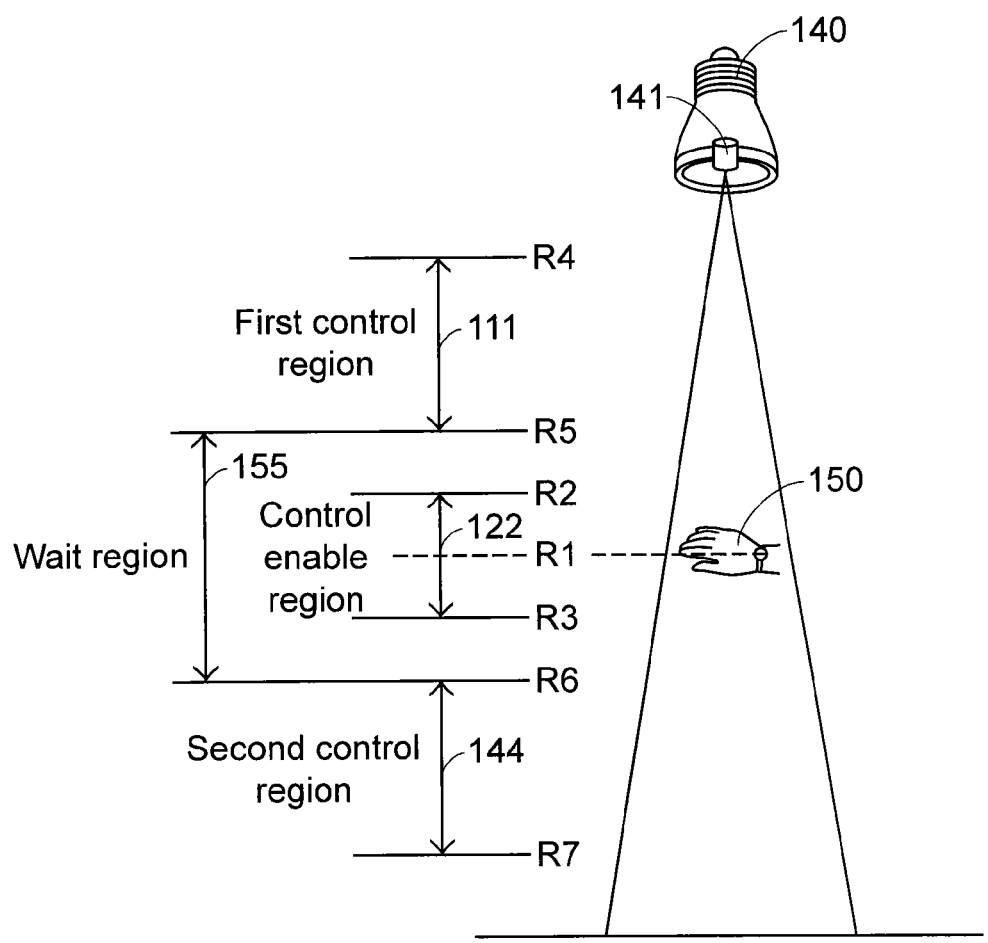
FIG. 2A is a schematic diagram illustrating several regions defined by a control method for use with a lighting system according to a preferred embodiment of the present invention.

FIG. 2A is a schematic diagram illustrating several regions defined by a control method for use with a lighting system according to a preferred embodiment of the present invention. The lighting system principally comprises a light source module and a processor (not shown). The light source module comprises a light source 140 and an ultrasonic transceiver 141.

When an object 150 (e.g. a user's hand) enters the sensing range of the ultrasonic transceiver 141, the processor is in a wait-for-enabling mode. Meanwhile, an ultrasonic signal emitted by the ultrasonic transceiver 141 is reflected by the object 150, and the reflected ultrasonic signal is then transmitted to a receiver of the ultrasonic transceiver 141. Upon receipt of the echo signal, the processor of the lighting system may measure the time of flight (TOF) of the ultrasonic signal. According to the TOF, the distance R1 between the object 150 and the ultrasonic transceiver 141 can be deduced.

According to the distance R1 between the object 12 and the ultrasonic transceiver 141, the processor defines a control enable region 122, a first control region 111, a second control region 144 and a wait region 155. As shown in FIG. 2A, the distance between the upper limit of the control enable region 122 and the ultrasonic transceiver 141 is R2, and the distance between the lower limit of the control enable region 122 and the ultrasonic transceiver 141 is R3. The distance between the upper limit of the first control region 111 and the ultrasonic transceiver 141 is R4, and the distance between the lower limit of the first control region 111 and the ultrasonic transceiver 141 is R5. The distance between the upper limit of the second control region 144 and the ultrasonic transceiver 141 is R6, and the distance between the lower limit of the second control region 144 and the ultrasonic transceiver 141 is R7. The distance between the upper limit of the wait region 155 and the ultrasonic transceiver 141 is R5, and the distance between the lower limit of the wait region 155 and the ultrasonic transceiver 141 is R6. As shown in FIG. 2A, R4<R5<R2<R1<R3<R6<R7. In this embodiment, the distance between the upper limit and the lower limit of the control enable region 122 is about 5 centimeters. The distance between the upper limit and the lower limit of the first control region 111 is ranged from about 10 to 50 centimeters. The distance between the upper limit and the lower limit of the second control region 144 is ranged from about 10 to 50 centimeters. The distance between the upper limit and the lower limit of the wait region 155 is ranged from about 10 to 30 centimeters.

Figure 2B:
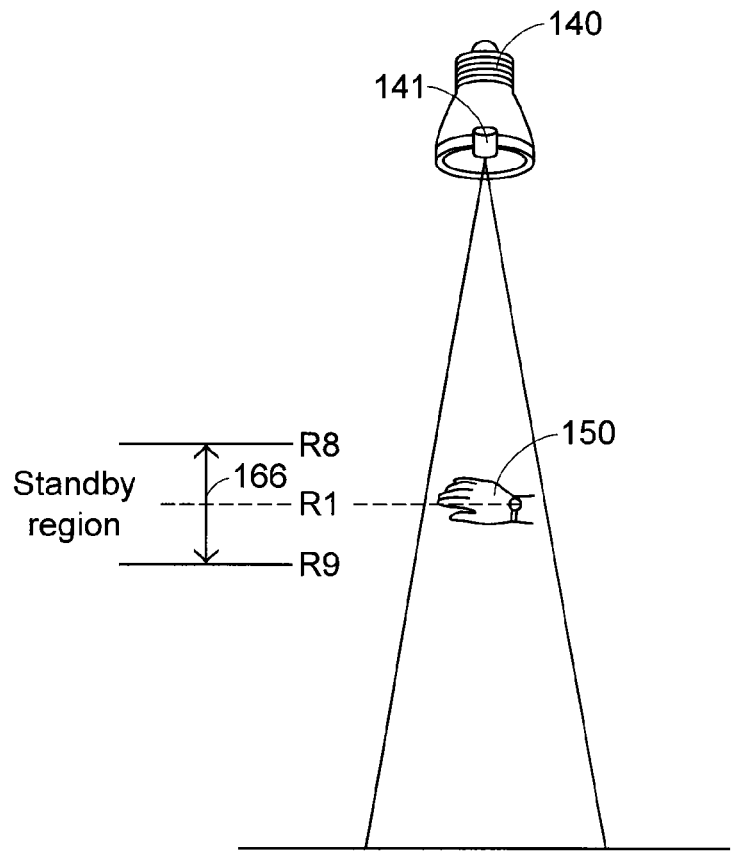
FIG. 2B is a schematic diagram illustrating a standby region defined by the control method of the present invention.
Figure 2C:
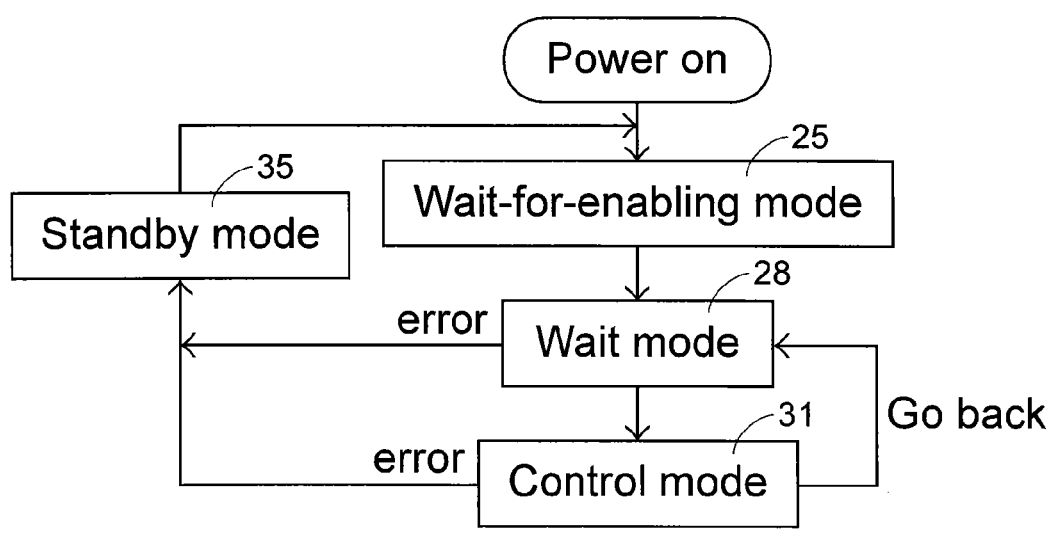
FIG. 2C is a schematic diagram illustrating a flowchart of controlling optical characteristics of the lighting system.

Please refer to FIG. 2C, which is a schematic diagram illustrating a flowchart of controlling optical characteristics of the lighting system. When the lighting system is powered on and the object 150 is positioned in the sensing range of the ultrasonic transceiver 141, the processor will enter the wait-for-enabling mode (Step 25). In the wait-for-enabling mode, the processor may measure the TOF of the ultrasonic signal and calculate the distance R1 between the object 150 and the ultrasonic transceiver 141 according to the TOF. By referring to the distance R1, the processor defines the control enable region 122, the first control region 111, the second control region 144 and the wait region 155, as can be seen in FIG. 2A. In a case that the object 150 has been positioned in the control enable region 122 (i.e. the region between R2 and R3) for more than a first time interval (e.g. 1 second), the processor will enter the wait mode (Step 28).

Whereas, if the object 150 has been positioned in the control enable region 122 for less than the first time interval, the processor is still in the wait-for-enabling mode and continuously calculate the distance R1 between the object 150 and the ultrasonic transceiver 141 according to the TOF. Until the object 150 has been positioned in the control enable region 122 for more than the first time interval, the processor will enter the wait mode (Step 28).

If the object 150 is moved off the wait region 155 within a second time interval (e.g. 5 seconds) in the wait mode, the optical characteristics need to be adjusted. For example, if the object 150 is moved to the first control region 111 within the second time interval, the processor will enter a control mode (Step 31). Meanwhile, a first controlling operation is executed to adjust a first optical characteristic such as the light color. Whereas, if the object 150 is moved to the second control region 144 within the second time interval, the processor will also enter the control mode (Step 31). Meanwhile, a second controlling operation is executed to adjust a second optical characteristic such as the light strength. The first control region 111 and the second control region 144 are used for controlling different optical characteristics respectively. Whereas, if the object 150 is continuously positioned in the second control region 144 within the second time interval or the object 150 is moved off the first control region 111 and the second control region 144, the processor will issue an erroneous signal and enter a standby mode (Step 35).

Moreover, when the processor enters the control mode to execute the first controlling operation, the first optical characteristic is subject to a cyclic variation. That is, a series of predetermined light colors are cyclically changed. At the time that when the object 150 is being moved off the first control region 111, a desired light color is selected. On the other hand, when the processor enters the control mode to execute the second controlling operation, the second optical characteristic is subject to a cyclic variation. That is, a series of predetermined light strengths are cyclically changed. At the time that when the object 150 is being moved off the second control region 144, a desired light strength is selected. Afterwards, the processor goes back to the wait mode (Step 28). Whereas, if the object 150 is continuously positioned in the first control region 111 or the second control region 144 and the time period of executing the controlling operation exceeds a third time interval (e.g. 1 minute), the processor will issue an erroneous signal and enter a standby mode (Step 35).

When the processor is in the standby mode (Step 35), the processor will define a standby region 166 according to the distance R1 between the object 150 and the ultrasonic transceiver 141. As shown in FIG. 2B, the distance between the upper limit of the standby region 166 and the ultrasonic transceiver 141 is R8, and the distance between the lower limit of the standby region 166 and the ultrasonic transceiver 141 is R9. In an embodiment, the distance between the upper limit and the lower limit of the standby region 166 is ranged from about 10 to 20 centimeters. Next, the processor continuously discriminates whether the object 150 is still positioned in the standby region 166. If the object 150 is still positioned in the standby region 166, the processor is maintained in the standby mode. Whereas, if the object 150 is moved off the standby region 166, the processor will enter the wait-for-enabling mode again (Step 25). The procedures of controlling optical characteristics of the lighting system will be illustrated in detail hereinafter.

Figure 3A:
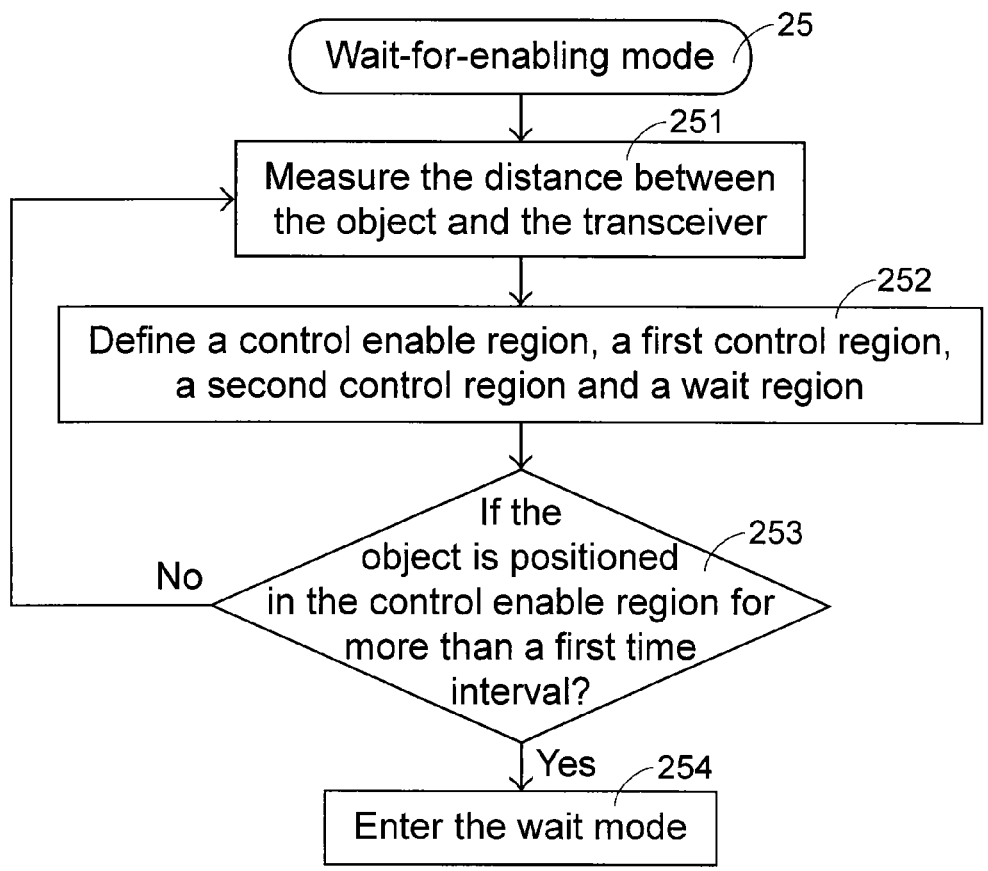
FIG. 3A is a flowchart illustrating operations of the wait-for-enabling mode.

FIG. 3A is a flowchart illustrating operations of the wait-for-enabling mode. When the processor enters the wait-for-enabling mode (Step 25), the processor may measure the distance between the object (within the sensing range) and the ultrasonic transceiver (Step 251). According to the distance between the object and the ultrasonic transceiver, the processor defines a control enable region, a first control region, a second control region and a wait region (Step 252). Next, the processor will discriminate whether the object is positioned in the control enable region for more than a first time interval (Step 253). If the object has been positioned in the control enable region for more than a first time interval, the processor will enter the wait mode (Step 254). Otherwise, the Step 251 is repeatedly done.

Figure 3B:
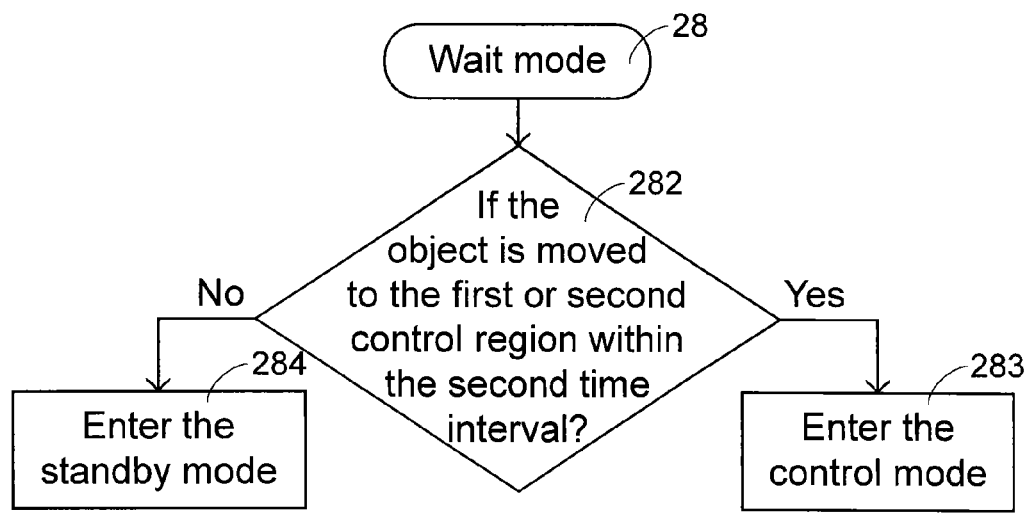
FIG. 3B is a flowchart illustrating operations of the wait mode.

FIG. 3B is a flowchart illustrating operations of the wait mode. When the processor enters the wait mode (Step 28), the processor may discriminate whether the object is moved to the first control region or the second control region within a second time interval (Step 282). If the object is moved to the first control region or the second control region within the second time interval, the processor will enter a control mode (Step 283). Otherwise, the processor will enter a standby mode (Step 284).

Figure 3C:
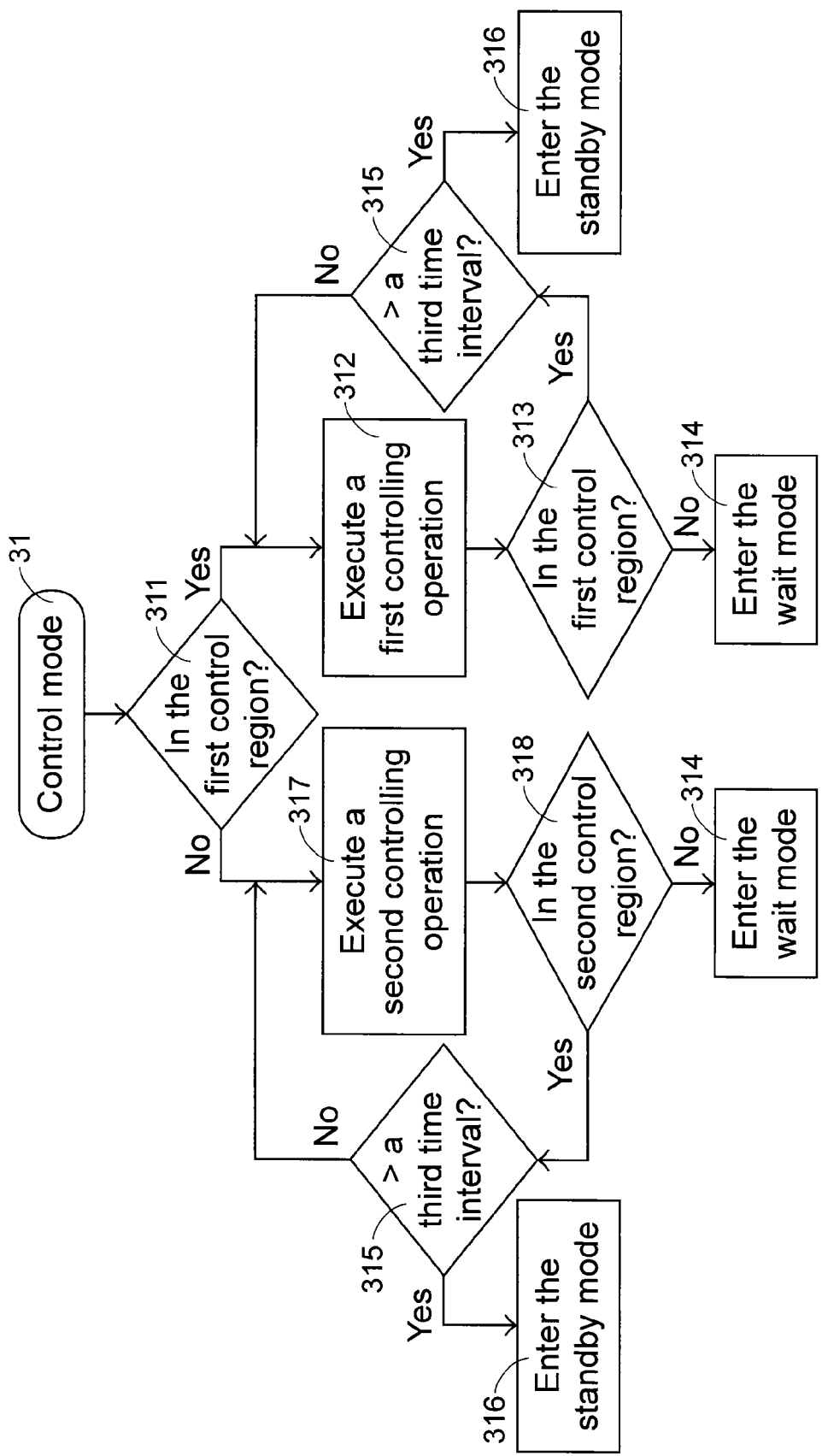
FIG. 3C is a flowchart illustrating operations of the control mode.

FIG. 3C is a flowchart illustrating operations of the control mode. When the processor enters the control mode (Step 311), the processor may discriminate whether the object is positioned in the first control region (Step 311). If the object is positioned in the first control region, the processor will execute a first controlling operation (Step 312). Next, the processor will discriminate whether the object is still positioned in the first control region (Step 313). If the object is not positioned in the first control region, the processor will enter the wait mode (Step 314). If the object is still positioned in the first control region, the processor will discriminate whether the object has been continuously positioned in the first control region for more than a third time interval (Step 315). If the object has been continuously positioned in the first control region for more than the third time interval, the processor will enter the standby mode (Step 316). Otherwise, the processor continuously executes the first controlling operation (Step 312) until the object is detected to be not positioned in the first control region.

In the control mode, the processor discriminates whether the object is positioned in the first control region (Step 311). If the object is not positioned in the first control region, the processor will execute a second controlling operation (Step 317). Next, the processor will discriminate whether the object is still positioned in the second control region (Step 318). If the object is not positioned in the second control region, the processor will enter the wait mode (Step 314). Whereas, if the object is still positioned in the second control region, the processor will discriminate whether the object has been continuously positioned in the second control region for more than a third time interval (Step 319). If the object has been continuously positioned in the second control region for more than the third time interval, the processor will enter the standby mode (Step 316). Otherwise, the processor continuously executes the second controlling operation (Step 317) until the object is detected to be not positioned in the second control region.

When the processor enters the control mode to execute the first controlling operation, the first optical characteristic (e.g. the light color) is subject to a cyclic variation. In an embodiment, the frequency of changing the light colors is one per second. In a case that the third time interval is 1 minute, at most 60 times of light colors are cyclically changed when the object is positioned in first control region. If the object has been positioned in the first control region for more than the third time interval, the processor will issue an erroneous signal and enter a standby mode. On the other hand, if the object is moved off the first control region within the third time interval, a desired light color is selected based on the cyclic variation of the first optical characteristic (e.g. the cyclic variation of the different light colors) and the processor enters the wait mode.

Similarly, when the processor enters the control mode to execute the second controlling operation, the second optical characteristic (e.g. the light strength) is subject to a cyclic variation. In an embodiment, the frequency of changing the light strengths is one per second. In a case that the third time interval is 1 minute, at most 60 times of light strengths are cyclically changed when the object is positioned in second control region. If the object has been positioned in the second control region for more than the third time interval, the processor will issue an erroneous signal and enter a standby mode. On the other hand, if the object is moved off the second control region within the third time interval, a desired light strength is selected based on the cyclic variation of the second optical characteristic (e.g. the cyclic variation of the different light strengths) and the processor enters the wait mode.

Figure 3D:
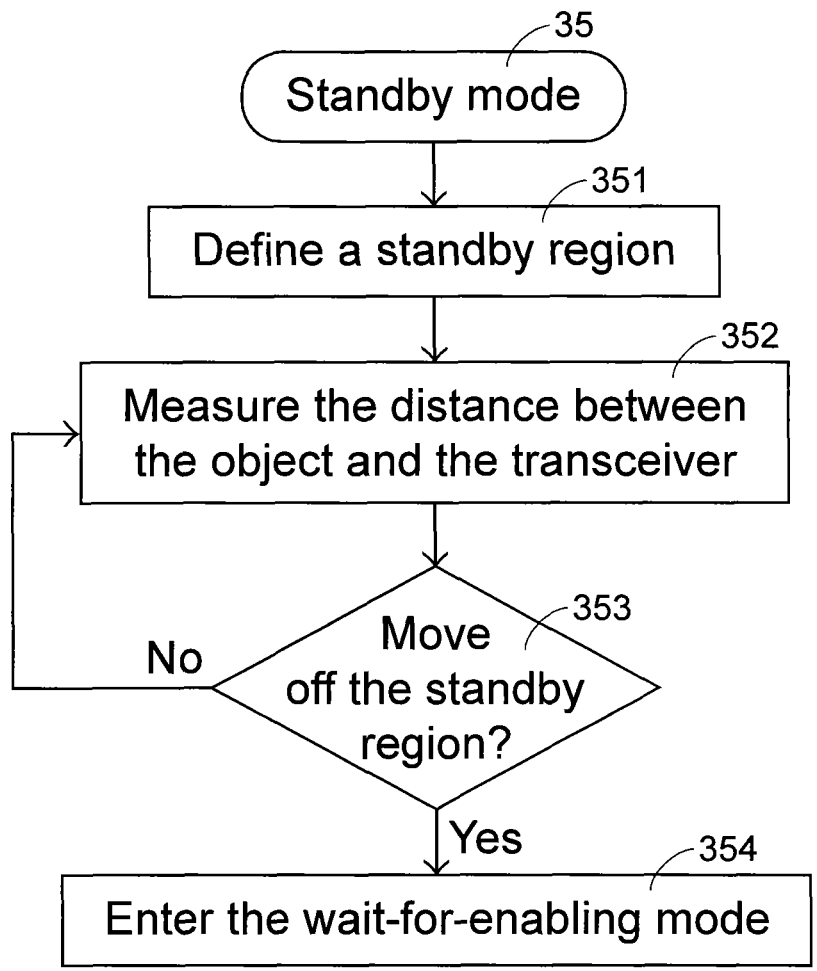
FIG. 3D is a flowchart illustrating operations of the standby mode.

FIG. 3D is a flowchart illustrating operations of the standby mode. When the processor enters the standby mode (Step 3), the processor may define a standby region (Step 351). Next, the processor may measure the distance between the object and the ultrasonic transceiver (Step 352). Next, the processor will discriminate whether the object is moved off the standby region (Step 353). If the object is not moved off the standby region, the processor will measure the distance between the object and the ultrasonic transceiver again (Step 352). Whereas, if the object is moved off the standby region, the processor will enter the wait-for-enabling mode (Step 354).

Figure 4:
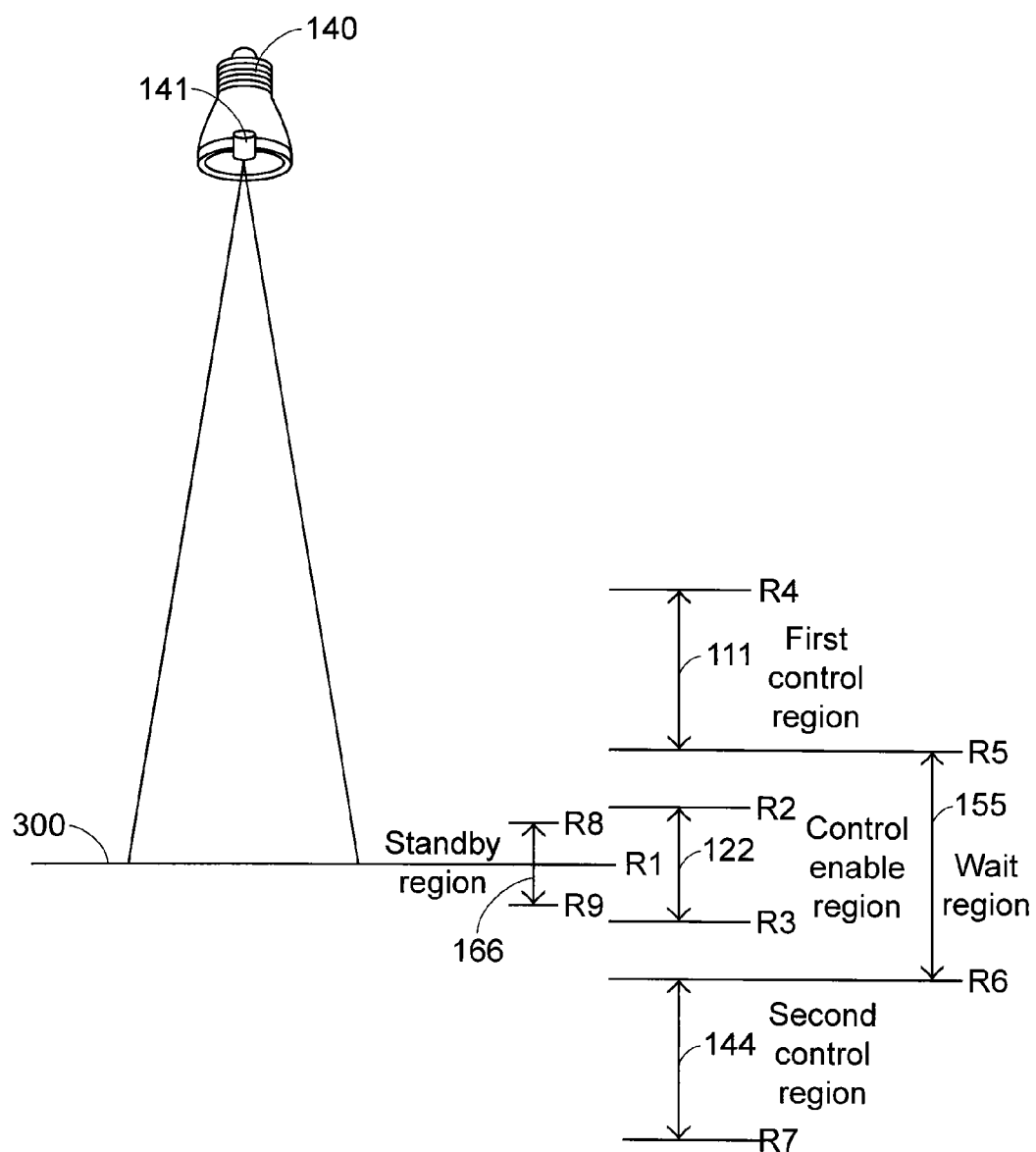
FIG. 4 is a schematic diagram illustrating an example of implementing the control method of the present invention, in which the floor is deemed as the object.

Hereinafter, several examples of implementing the control method of the present invention will be illustrated. In a first example, no object is moved to the sensing range after the lighting system is powered on. Since the ultrasonic signal is reflected by the floor, the floor 300 can be deemed as an "object". FIG. 4 is a schematic diagram illustrating a first example of implementing the control method of the present invention. When the processor discriminates that the floor 300 is positioned within the sensing range of the ultrasonic transceiver 141, the processor will enter the wait-for-enabling mode (Step 25). In the wait-for-enabling mode, the processor may measure the TOF of the ultrasonic signal and calculate the distance R1 between the object (i.e. the floor 300) and the ultrasonic transceiver 141 according to the TOF. By referring to the distance R1, the processor defines the control enable region 122 (R2~R3), the first control region 111 (R4~R5), the second control region 144 (R6~R7) and the wait region 155 (R5~R6). Since the object (i.e. the floor 300) has been positioned in the control enable region 122 for more than a first time interval, the processor will enter the wait mode (Step 28). Since the object (i.e. the floor 300) has been not moved off the wait region 155 for more than the second time period, the processor will enter the standby mode (Step 35). When the processor is in the standby mode (Step 35), the processor will define a standby region 166 (R8~R9). Since the object (i.e. the floor 300) is continuously positioned in the standby region 166, the processor is maintained in the standby mode. In other words, the light color or the light strength of the lighting system fails to be adjustable in the situation where the floor 300 is served as the object.

In a second example, after the lighting system is powered on, a household pet passes through the sensing range of the ultrasonic transceiver 141. The ultrasonic signal emitted by the ultrasonic transceiver 141 is reflected by the object (i.e. the household pet) and the reflected ultrasonic signal then is received the ultrasonic transceiver 141. When the processor discriminates that the object (i.e. the household pet) is positioned within the sensing range of the ultrasonic transceiver 141, the processor will enter the wait-for-enabling mode (Step 25). In the wait-for-enabling mode, the processor may measure the TOF of the ultrasonic signal and calculate the distance R1 between the object (i.e. the household pet) and the ultrasonic transceiver 141 according to the TOF. In the wait-for-enabling mode (Step 25), if the object (i.e. the household pet) is moved off the sensing range of the ultrasonic transceiver 141, the processor will not enter the wait mode (Step 28). Under this circumstance, the floor is deemed as an "object" again and eventually the processor is maintained in the standby mode, as is described in the first example. In other words, the strategy of the present control method can prevent erroneous operation caused by the household pet.

Figures 5A, 5B:
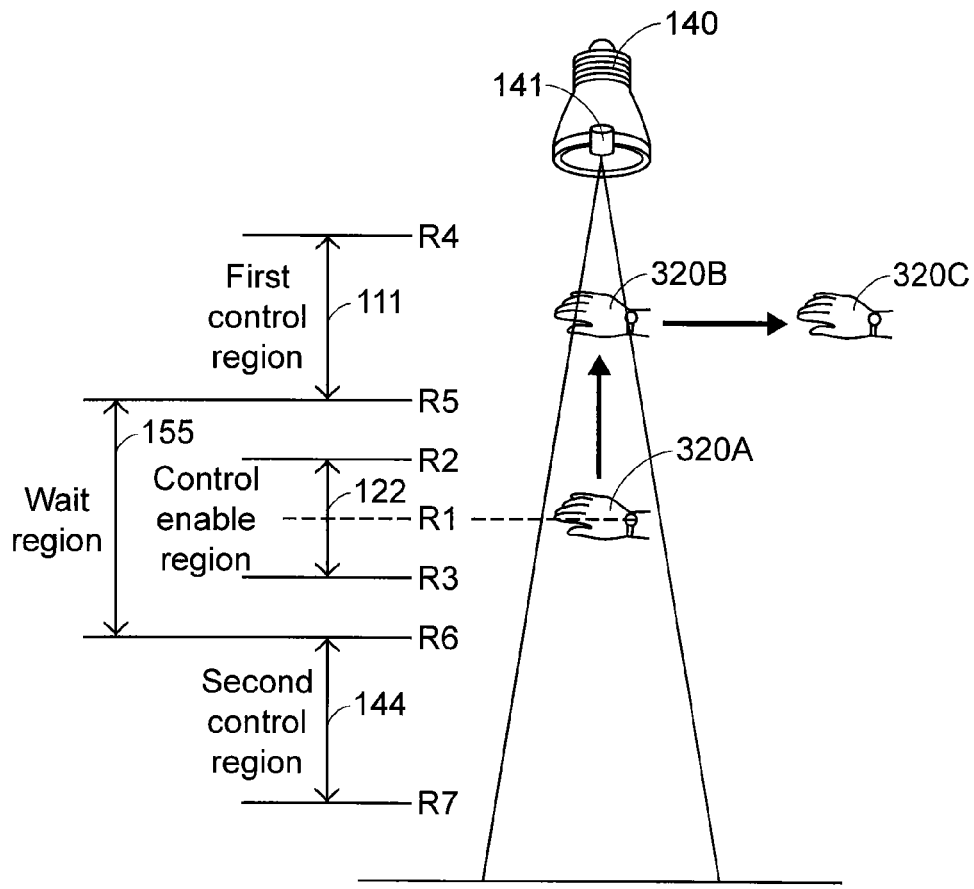
FIG. 5A is a schematic diagram illustrating an example of controlling the first optical characteristic according to the control method of the present invention.
FIG. 5B schematically illustrates a table associated with a series of color parameters in a cyclic variation.

In a third example, after the lighting system is powered on, a user's hand is positioned in the sensing range of the ultrasonic transceiver 141 for controlling the first optical characteristic. FIG. 5A is a schematic diagram illustrating a third example of implementing the control method of the present invention. When the object 320A (e.g. the user's hand) enters the sensing range of the ultrasonic transceiver 141, the processor will enter a wait-for-enabling mode (Step 25). In the wait-for-enabling mode, the processor may measure the TOF of the ultrasonic signal and calculate the distance R1 between the object 320A (e.g. the user's hand) and the ultrasonic transceiver 141 according to the TOF. By referring to the distance R1, the processor defines the control enable region 122 (R2~R3), the first control region 111 (R4~R5), the second control region 144 (R6~R7) and the wait region 155 (R5~R6). If the object 320A (e.g. the user's hand) has been positioned in the control enable region 122 for more than a first time interval, the processor will enter the wait mode (Step 28). In the wait mode, if the object 320B (e.g. the user's hand) is moved to the first control region 111 within the second time interval, the processor will enter a control mode (Step 31). Meanwhile, a first controlling operation is executed to adjust a first optical characteristic such as the light color.

FIG. 5B schematically illustrates a table associated with a series of color parameters in a cyclic variation. As shown in FIG. 5B, 12 sets of color parameters are used to adjust 12 kinds of light colors. Each set of color parameters include the proportion of brightness of red (R), green (G) and blue (B) LEDs. By using the combination of red (R), green (G) and blue (B) LEDs, output light beams with various emission colors can be produced. For example, the first set of color parameters (1st) include only red (R) color at 80% power rating, so that the proportion of brightness of red (R), green (G) and blue (B) LEDs is 1:0:0. The second set of color parameters (2nd) include red (R) color at 60% power rating and green color at 20% power rating, so that the proportion of brightness of red (R), green (G) and blue (B) LEDs is 3:1:0. The rest may be deduced by analogy.

In an embodiment, when the object 320B (e.g. the user's hand) is moved to the first control region 111, the 12 kinds of light colors as shown in FIG. 5B are cyclically changed in the sequence of 5th→6th→7th→8th→ . . . →12th→1st→2nd→3rd→4th→5th→6th→ . . . for example. In addition, the light colors are changed once per second. At the time that when the object 320C (e.g. the user's hand) is being moved off the sensing range of the ultrasonic transceiver 141, the cyclic variation is interrupted and the light with desired color parameters is selected.

Figures 6A, 6B:
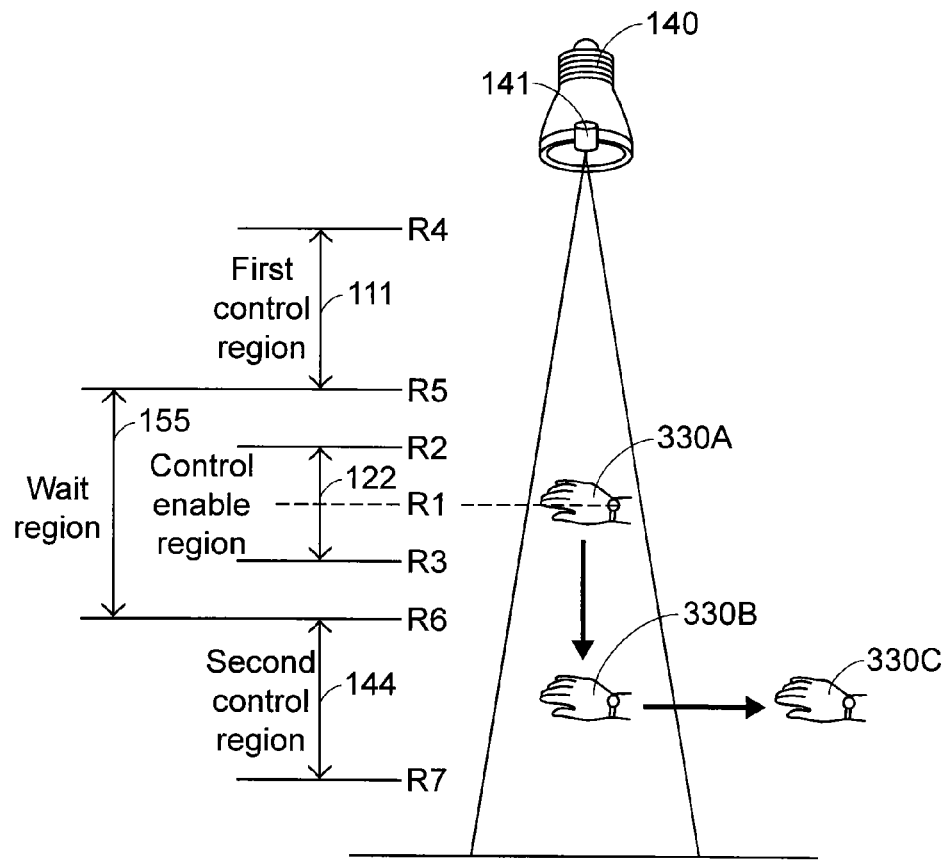
FIG. 6A is a schematic diagram illustrating an example of controlling the second optical characteristic according to the control method of the present invention.
FIG. 6B schematically illustrates a table associated with a series of intensity parameters in a cyclic variation.

In a fourth example, after the lighting system is powered on, a user's hand is positioned in the sensing range of the ultrasonic transceiver 141 for controlling the second optical characteristic. FIG. 6A is a schematic diagram illustrating a fourth example of implementing the control method of the present invention. When the object 330A (e.g. the user's hand) enters the sensing range of the ultrasonic transceiver 141, the processor will enter a wait-for-enabling mode (Step 25). In the wait-for-enabling mode, the processor may measure the TOF of the ultrasonic signal and calculate the distance R1 between the object 330A (e.g. the user's hand) and the ultrasonic transceiver 141 according to the TOF. By referring to the distance R1, the processor defines the control enable region 122 (R2~R3), the first control region 111 (R4~R5), the second control region 144 (R6~R7) and the wait region 155 (R5~R6). If the object 330A (e.g. the user's hand) has been positioned in the control enable region 122 for more than the first time interval, the processor will enter the wait mode (Step 28). In the wait mode, if the object 330B (e.g. the user's hand) is moved to the second control region 144 within the second time interval, the processor will enter a control mode (Step 31). Meanwhile, a second controlling operation is executed to adjust a second optical characteristic such as the light strength.

FIG. 6B schematically illustrates a table associated with a series of intensity parameters in a cyclic variation. As shown in FIG. 6B, 12 intensity parameters are used to adjust 12 kinds of light strengths. The intensity parameters of FIG. 6B in combination with the color parameters of FIG. 5B are employed to adjust the light strength. For example, if the second set of color parameters and the first intensity parameter (1st) are selected, a red light at 72% (1.2×60%=72%) power rating and a green light at 24% (1.2×20%=24%) power rating are mixed and outputted. Similarly, if the second set of color parameters and the second intensity parameter (2nd) are selected, a red light at 66% (1.1×60%=66%) power rating and a green light at 22% (1.1×20%=22%) power rating are mixed and outputted. The rest may be deduced by analogy.

In an embodiment, when the object 330B (e.g. the user's hand) is moved to the second control region 144, the 12 kinds of light strengths as shown in FIG. 6B are cyclically changed in the sequence of 5th→6th→7th→8th→ . . . →12th→1st→2nd→3rd→4th→5th→6th→ . . . for example. In addition, the light strengths are changed once per second. At the time that when the object 3300 (e.g. the user's hand) is being moved off the sensing range of the ultrasonic transceiver 141, the cyclic variation is interrupted and the light with desired intensity parameters is selected.

From the above description, the control method of the lighting system according to the present invention uses an ultrasonic sensor to detect the position of the object within the sensing range and define several control regions. When the object is moved to different control regions, various controlling operations are executed to adjust different optical characteristics. The present invention is illustrated by referring to adjustment of the light color or the light strength. Nevertheless, the control method of the present invention can be used to control the light color temperature, the light glisten, the area of the illuminating zone, the shape of the illuminating zone, the position of the illuminating zone or the on/off statuses of the light source.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method for use with a lighting system, the lighting system comprising a light source and an ultrasonic transceiver, the control method being characterized by comprising steps of:
    measuring the time of an ultrasonic signal emitted from the ultrasonic transceiver and reflected by an object to reach the ultrasonic sensor, thereby obtaining a time of flight;
    calculating a distance between the object and the ultrasonic transceiver according to the time of flight, dividing a detection region into a first control region and a second control region according to the distance; and
    moving the object to the first control region, thereby performing a first controlling operation and adjusting a first optical characteristic, and/or moving the object to the second control region, thereby performing a second controlling operation and adjusting a second optical characteristic.

2. The control method according to claim 1, characterized in that the light source of the lighting system includes a light emitting diode.

3. The control method according to claim 1, characterized in that the light source of the lighting system includes a red light emitting diode, a green light emitting diode and a blue light emitting diode.

4. The control method according to claim 1, characterized in that the optical characteristic includes the light color, the light color temperature, the light strength, an area of the illuminating zone, a shape of the illuminating zone, a position of the illuminating zone or on/off statuses of the light source.

5. The control method according to claim 1, characterized in that the first controlling operation is performed to adjust the light color.

6. The control method according to claim 5, characterized in that the first controlling operation further includes steps of: providing multiple sets of color parameters associated with different light colors; and cyclically changing the multiple sets color parameters at a specified frequency, thereby cyclically changing the light colors.

7. The control method according to claim 1, characterized in that the second controlling operation is performed to adjust the light strength.

8. The control method according to claim 7, characterized in that the second controlling operation includes steps of: providing multiple intensity parameters associated with different light strengths; and cyclically changing the multiple intensity parameters at a specified frequency, thereby cyclically changing the light strengths.

9. A control method for use with a lighting system, the lighting system comprising a light source and an ultrasonic transceiver, the control method characterized by comprising steps of:
    entering a wait-for-enabling mode after the lighting system is powered on;
    calculating a distance between an object and the ultrasonic transceiver by the ultrasonic sensor in the wait-for-enabling mode, dividing a detection region into at least two control regions according to the distance for respectively controlling a first optical characteristic and a second optical characteristic, and then entering a wait mode, wherein the first optical characteristic is different from the second optical characteristic;
    when in the wait mode, discriminating whether the object is moved to one specified control region within a specified time interval, entering a control mode if the object is moved to the specified control region within the specified time interval, otherwise, entering a standby mode;
    when in the control mode, performing a controlling procedure of the optical characteristic corresponding to the control region; and
    when in the standby mode, discriminating whether the distance between the object and the ultrasonic transceiver is changed by the ultrasonic sensor, entering the wait-for-enabling mode if the distance is changed, otherwise, keeping in the standby mode.

10. The control method according to claim 9, characterized in that the optical characteristic includes the light color, the light color temperature, the light strength, the area of the illuminating zone, the shape of the illuminating zone, the position of the illuminating zone or the on/off statuses of the light source.

11. The control method according to claim 9, characterized in that in the control mode, the controlling procedure is for controlling the light color of the lighting system, and the controlling procedure further includes steps of: providing multiple sets of color parameters associated with different light colors; and cyclically changing the multiple sets color parameters at a specified frequency, thereby cyclically changing the light colors.

12. The control method according to claim 9, characterized in that in the control mode, the controlling procedure is for controlling the light strength of the lighting system, and the controlling procedure further includes steps of: providing multiple intensity parameters associated with different light strengths; and cyclically changing the multiple intensity parameters at a specified frequency, thereby cyclically changing the light strengths.

* * * * *